United States Patent
Weber et al.

(10) Patent No.: US 11,305,377 B2
(45) Date of Patent: Apr. 19, 2022

(54) ADD-ON MODULE FOR INTERPOSING BETWEEN A CONTROL DEVICE AND A LASER MACHINING HEAD OF A LASER MACHINING SYSTEM

(71) Applicant: Precitec GmbH & Co. KG, Gaggenau (DE)

(72) Inventors: Marian Weber, Karlsruhe (DE); Andreas Rudolf, Kuppenheim (DE)

(73) Assignee: Precitec GmbH & Co. KG, Gaggenau (DE)

( * ) Notice: Subject to any disclaimer, the term of this patent is extended or adjusted under 35 U.S.C. 154(b) by 15 days.

(21) Appl. No.: 16/726,017

(22) Filed: Dec. 23, 2019

(65) Prior Publication Data
US 2021/0187658 A1 Jun. 24, 2021

(51) Int. Cl.
*B23K 26/03* (2006.01)
*B23K 26/70* (2014.01)
*B23K 26/06* (2014.01)
*B23K 26/14* (2014.01)

(52) U.S. Cl.
CPC ........ *B23K 26/032* (2013.01); *B23K 26/0626* (2013.01); *B23K 26/1464* (2013.01); *B23K 26/702* (2015.10)

(58) Field of Classification Search
CPC .............. B23K 26/032; B23K 26/702; B23K 26/0626; B23K 26/1464
USPC ........................................ 219/121.61, 121.67
See application file for complete search history.

(56) References Cited

U.S. PATENT DOCUMENTS

| | | | | |
|---|---|---|---|---|
| 5,233,150 A | * | 8/1993 | Schneebeli | B23K 9/046 219/76.14 |
| 5,305,183 A | | 4/1994 | Teynor | |
| 5,334,816 A | * | 8/1994 | Sugiyama | B23K 26/032 219/121.75 |
| 5,360,960 A | * | 11/1994 | Shirk | B23K 26/032 219/121.63 |

(Continued)

FOREIGN PATENT DOCUMENTS

| CN | 106514013 A | 3/2017 |
|---|---|---|
| CN | 106312311 B | 10/2018 |

(Continued)

OTHER PUBLICATIONS

European Patent Office, International Search Report and Written Opinion issued in corresponding international application No. PCT/EP2020/086019, dated Apr. 13, 2021, 28 pp.

*Primary Examiner* — Jimmy Chou
(74) *Attorney, Agent, or Firm* — Dinsmore & Shohl LLP

(57) ABSTRACT

An add-on module for intercoupling or interposing between a control device, in particular a system control, and a laser machining head of a laser machining system is provided. The add-on module includes: a first interface, and is connectable with the laser machining head and/or with at least one sensor device of the laser machining system via the first interface so as to exchange data; a second interface, wherein the add-on module is connectable to the control device via the second interface so as to exchange data; and a processing unit configured to process data and output the processed data via at least one of the first, second, and third interfaces. Furthermore, a laser machining device includes such an add-on module is provided.

17 Claims, 8 Drawing Sheets

(56) References Cited

U.S. PATENT DOCUMENTS

| | | | | |
|---|---|---|---|---|
| 5,589,090 A * | 12/1996 | Song | .................... | B23K 26/032 |
| | | | | 219/121.62 |
| 6,430,472 B1 * | 8/2002 | Boillot | ................. | G05B 19/056 |
| | | | | 219/121.61 |
| 6,580,959 B1 * | 6/2003 | Mazumder | ......... | G05B 19/4185 |
| | | | | 700/121 |
| 6,635,849 B1 * | 10/2003 | Okawa | ................. | B23K 26/043 |
| | | | | 219/121.7 |
| 7,566,844 B2 * | 7/2009 | Egawa | ................... | B23K 26/04 |
| | | | | 219/121.78 |
| 9,317,031 B2 | 4/2016 | Hammann et al. | | |
| 9,839,975 B2 | 12/2017 | Beutler | | |
| 9,895,769 B2 * | 2/2018 | Tokito | ................. | B23K 26/048 |
| 10,427,242 B2 | 10/2019 | Regaard et al. | | |
| 10,654,132 B2 * | 5/2020 | Matsumoto | .......... | B23K 26/082 |
| 11,004,743 B2 * | 5/2021 | Fujita | ................. | H01L 21/268 |
| 2002/0125222 A1 * | 9/2002 | Iwase | .................... | B23K 26/08 |
| | | | | 219/121.8 |
| 2003/0183608 A1 * | 10/2003 | Yamazaki | ............... | B23K 26/10 |
| | | | | 219/121.83 |
| 2003/0192865 A1 * | 10/2003 | Cole | ................. | B23K 26/1436 |
| | | | | 219/121.67 |
| 2004/0124227 A1 * | 7/2004 | Seki | .................... | B23K 31/125 |
| | | | | 228/103 |
| 2004/0206735 A1 * | 10/2004 | Okuda | ................ | B23K 26/0884 |
| | | | | 219/121.78 |
| 2008/0035619 A1 * | 2/2008 | Hamaguchi | ........ | B23K 26/0884 |
| | | | | 219/121.79 |
| 2008/0172143 A1 * | 7/2008 | Schwarz | ................ | B23K 26/22 |
| | | | | 700/166 |
| 2010/0174407 A1 * | 7/2010 | Fukawa | ................. | B23K 26/04 |
| | | | | 700/245 |
| 2011/0180521 A1 * | 7/2011 | Quitter | ............... | B23K 26/0622 |
| | | | | 219/121.73 |
| 2011/0192825 A1 * | 8/2011 | Calefati | ................. | B23K 31/12 |
| | | | | 219/121.64 |
| 2011/0220623 A1 * | 9/2011 | Beutler | .............. | B23K 26/0876 |
| | | | | 219/121.67 |
| 2012/0255937 A1 * | 10/2012 | Oe | ......................... | B23K 26/26 |
| | | | | 219/121.63 |
| 2012/0255938 A1 * | 10/2012 | Oe | ....................... | B23K 26/082 |
| | | | | 219/124.22 |
| 2013/0319980 A1 | 12/2013 | Hesse et al. | | |
| 2014/0116997 A1 * | 5/2014 | Inoue | .................... | B23K 26/38 |
| | | | | 219/121.67 |
| 2015/0231738 A1 * | 8/2015 | Ota | ...................... | B23K 26/382 |
| | | | | 219/121.71 |
| 2017/0220927 A1 * | 8/2017 | Takigawa | ............... | B23K 26/21 |
| 2017/0232558 A1 * | 8/2017 | Kano | ................. | B23K 26/0861 |
| | | | | 219/121.72 |
| 2017/0266758 A1 * | 9/2017 | Fukui | ................... | B23K 26/032 |
| 2018/0009059 A1 * | 1/2018 | Aoki | ...................... | B25J 9/1697 |
| 2018/0299260 A1 * | 10/2018 | Nakamura | .............. | G01B 11/24 |
| 2018/0333805 A1 * | 11/2018 | Matsumoto | ........... | B23K 26/21 |
| 2019/0022794 A1 * | 1/2019 | Nishikawa | ............. | B23K 26/36 |
| 2019/0061064 A1 * | 2/2019 | Murakami | ......... | B23K 26/0821 |
| 2019/0126404 A1 * | 5/2019 | Matsumoto | .......... | B23K 26/082 |
| 2019/0200000 A1 * | 6/2019 | Kumagai | ............. | G02B 26/127 |
| 2020/0023461 A1 * | 1/2020 | Galbraith | ................ | H01S 3/067 |
| 2020/0114467 A1 * | 4/2020 | Nogami | ............. | B23K 26/0861 |
| 2020/0388980 A1 * | 12/2020 | Kyoto | ................ | B23K 26/0608 |
| 2021/0117931 A1 * | 4/2021 | Abe | ..................... | G03F 7/70975 |

FOREIGN PATENT DOCUMENTS

| | | |
|---|---|---|
| DE | 102016219927 B4 | 8/2018 |
| EP | 2357057 A1 | 8/2011 |
| EP | 3210714 A1 | 8/2017 |
| EP | 3189926 B1 | 5/2018 |
| EP | 3159093 B1 | 7/2018 |
| WO | 2016/131022 A1 | 8/2016 |

\* cited by examiner

ADD-ON MODULE FOR INTERPOSING BETWEEN A CONTROL DEVICE AND A LASER MACHINING HEAD OF A LASER MACHINING SYSTEM

FIELD OF THE INVENTION

The present disclosure relates to an add-on module for intercoupling or interposing between a control device, in particular a system control, and a laser machining head of a laser machining system, for example for communication between the control device and the laser machining head and/or for retrofitting functions into the laser machining system, such as functions for monitoring and/or controlling the laser machining system or head. The present disclosure also relates to a laser machining system with such an add-on module. In particular, the present disclosure relates to an add-on module formed separately or disconnectedly from the control device and the laser machining head.

BACKGROUND OF THE INVENTION

In a laser machining system 100 for machining a workpiece 2 by means of a laser beam, as shown in FIG. 1, the laser beam, which is generated by a laser beam generating device 101, also called a laser light source, or emerging from an end of a laser fiber, is focused or converged onto the workpiece to be machined by means of beam guiding and focusing optics. The machining may include, for example, laser cutting, soldering or welding a workpiece 2. A laser machining process may include various steps, such as piercing, cutting, welding and/or evaporating operations. The laser machining system 100 may comprise a laser machining device 102, for example a laser machining head, such as a laser cutting head or a laser welding head. When laser cutting, welding or soldering a workpiece 2, it is particularly important to regulate and monitor the laser machining process in order to be able to ensure the quality of machining. The open loop control of the process is carried out by means of a control device 103, also called "system control" or "CNC", whereas more complex functions, such as monitoring or closed loop control of the process, are carried out by an additional monitoring or control unit. The laser beam generating device 101 and the laser machining head 102 each receive data, in particular control data and/or machining parameters, from the control device 103. An operator or user of the laser machining system 1 has access to the control device 103. In other words, the control device 10 comprises a user interface for receiving data, in particular input data, from the operator and for outputting data, in particular output data, to the operator. The input data may be, for example, machining parameters predetermined for a respective machining process, in particular cutting parameters, or specific workpiece and/or material properties.

Generally, in laser cutting a coaxial gas jet is required in addition to laser radiation to drive the process. For setting the volume flow and pressure, a gas source is connected to the machining head 102 via a gas line 161 and typically a gas supply device 160 controlled by the control device 103, e.g. a gas valve, is interposed. Thereby, the control device is able to synchronize the laser emission and gas supply precisely with the process sequence and to coordinate them with each other.

In laser material machining, in particular in laser cutting, long setup procedures before the initial system start-up are typical. An important part of the initial start-up is beam centering. In current laser machining systems, manual beam centering must be performed after each fiber insertion. Furthermore, various components of a single system, such as the control device, the laser beam generating device, and the laser machining head, are not coordinated. Machining parameters may therefore vary from plant to plant. The initial start-up is therefore time-consuming and the components of a system must be precisely matched to each other.

In addition, machining parameters must be set, which may also be referred to as parameterization of the laser machining process or the system. Parameter sets for laser material machining processes are typically adjusted based on empirical values and depending on material and workpiece properties, in particular the type of material and thickness of the workpieces to be machined. Furthermore, the machining parameters may vary based on the properties of the components used, in particular optical components such as optics, mirrors and lenses, and component variances, impurities and environmental influences, in particular humidity and ambient temperature, in the system. Currently, the parameter sets for the laser machining processes have to be painstakingly determined experimentally and newly adjusted for each system with the help of expert knowledge. An adaptation of the parameter sets to a modified laser machining process, in particular other types of material, workpiece thicknesses, etc., requires a lot of know-how and expert knowledge and is therefore also time-consuming.

During the laser material machining process, in particular during laser cutting, measured values or sensor values in the laser machining head, for example of temperature and stray light sensors of protective glasses, are monitored and checked on the basis of empirically or experimentally determined threshold values. This allows monitoring the condition of the laser machining head, optical components thereof and the laser machining process, for example the cutting process. However, these sensor values alone are not meaningful and must be associated with additional boundary conditions, such as the current laser power, the current ambient temperature, humidity, etc. The interpretation of these relationships also requires expert knowledge and long experience in handling laser machining systems, in particular laser cutting systems, and is not obvious from the individual sensor readings.

For the initial start-up of a laser machining system, in particular a laser cutting system, and for controlling and monitoring a laser machining process, in particular for distance control, and for monitoring the state of the laser machining process or components or parts of the laser machining system, in particular a laser cutting head, a variety of independent units, devices and/or apparatus are needed currently.

EP 3 1590 93 B1 relates to a method for controlling laser cutting processes. In this case, the cutting operation is interrupted after a first machining operation, whereupon at least a portion of the machining path is scanned and at least one quality characteristic of the machining result is determined automatically.

DE 10 2016 219 927 B4 relates to a device and a method for monitoring a thermal cutting process on a workpiece. A camera captures images from a region of the workpiece to be monitored. An evaluation device evaluates the images. Herein, the images are clustered and the currently captured image may be assigned to these clusters via comparative image analysis. A control device may influence or change at least one controlled variable, for example the feed rate, the laser power, the focus position, and/or the gas pressure, whereby a consistently high cutting quality is to be achieved.

The computing power and storage capacity of a system are typically tailored precisely to the functions available at the time of delivery. It is not economical to provide large reserves. However, the useful life and longevity of a system may be more than 10 years. During this time, computing and storage technology is progressing considerably. The possibilities of adapting a control device, such as a system control, e.g. a CNC, of an existing laser machining system are limited, since it has a limited computing power or storage capacity. In addition, more and more input data from sensors and the like have to be processed. In principle, an upgrade of the CNC is possible, but practicality and economic viability are generally poor. The interfaces to existing systems (e.g., ERP, CAD/CAM) have to be adapted or reprogrammed, resulting in high costs without added value.

SUMMARY OF THE INVENTION

It is therefore an object of the invention to provide an add-on module for intercoupling or interposing between a control device, in particular a system control, and a laser machining head of a laser machining system, whereby a laser machining system can be retrofitted for current requirements.

It is a further object of the invention to provide an add-on module for intercoupling or interposing between a control device, in particular a system controller, and a laser machining head of a laser machining system in order to reduce data streams, in particular of sensors, to a system control of the laser machining system.

It is a further object of the invention to provide an add-on module for intercoupling or interposing between a control device, in particular a system control, and a laser machining head of a laser machining system, said module being configured to provide storage capacity and/or computing capacity and/or to take over at least one of the functions for control, data analysis and monitoring.

Finally, it is an object of the invention to reduce a number of additional units required for initial start-up, monitoring, open-loop control, closed-loop control and/or adaptation of the laser machining system or the laser machining process and to simplify the addition of new functions, for example for parameterization, control and/or monitoring of a laser machining or laser cutting process in a laser machining system.

In particular, it is an object of the invention to provide an add-on module configured to retrofit at least one function into a laser machining system. One of these functions may simplify and automate the initial start-up of a laser machining system. Another of these functions may include reacting immediately to changes in the laser machining process, particularly in real time. Another of these functions may allow monitoring and/or controlling the laser machining process and/or monitoring the state of a laser machining head in real time. Another of these functions may allow adjusting parameters of the laser machining process during the laser machining process, particularly in real time. Another of these functions may allow adjusting parameters of a step of the laser machining process independently of other steps of the laser machining process.

One or more of these objects are solved by the subject matter of the independent claim. Advantageous embodiments and further developments are the subject matter of dependent claims.

The invention is based on the basic idea of providing, for a laser machining system, an add-on module for intercoupling or interposing between a control device, in particular a system control or CNC, and a laser machining head of a laser machining system, in particular a laser cutting system, said add-on module having a plurality of interfaces, a processing unit, and optionally also a data storage or a database. In particular, the add-on module has interfaces to the laser machining head of the laser machining system, and to the control device of the laser machining system, also called system control. Here, the add-on module is configured as a stand-alone, additional component of the laser machining system, and is in particular provided separately from the laser machining head and the control device. Thus, the core functionality of the system, which is mapped to the control device (e.g., a CNC), may remain as unaffected as possible, while additional functions may be mapped via the attachment of the add-on module.

The typical control functions, in particular with regard to safety or movement of the workpiece and/or the laser machining head etc., may therefore remain in the system control. The add-on module serves to provide additional computing power for the laser machining system as well as a multitude of interfaces to the abovementioned components of the laser machining system. The possible functions of the add-on module include data storage, in particular long-term data storage, data processing and/or analysis, in particular in real time, for example by means of artificial intelligence, communication with the control device, and communication with the laser machining head.

The add-on module may also have at least one interface to a laser beam generating device associated with the laser machining head, for example a laser light source (referred to as "laser" for short) generating a laser beam, and/or to at least one sensor unit of the laser machining system. The add-on module may thus either communicate with a sensor unit via the laser machining head or directly via a dedicated interface. The add-on module may also have at least one interface to at least one gas supply unit, e.g. a gas valve, for controlling a process gas supply into the machining head and/or onto a workpiece.

The add-on module is used to communicate between system control and laser machining head. The add-on module may simplify or support the initial start-up of the laser machining system or the laser machining head. For example, the add-on module may assist in beam centering. In particular, the add-on module makes it possible to directly correct, adapt and/or optimize machining parameters sent by the system control to the laser machining head, for example based on sensor data, without the machining parameters having to be sent back to the system control. This allows an accelerated response to changes in the laser machining process and/or the state of the laser machining head in the closed-loop control of the laser machining process and unburdens the system control, which typically has only specifically tailored computing power, i.e., does not have redundant or free computing capacity. Correction, adjustment and/or optimization of machining parameters of the laser machining process is possible both online, i.e., during the execution of the laser machining process, as well as offline, i.e., after termination or interruption of the laser machining process. In addition, it is possible to adjust, adapt, correct and/or optimize individual steps or corresponding machining parameters of the laser machining process independently of other steps of the laser machining process. The add-on module also makes it possible to use the sensor signals or measured values of the various sensors of the laser machining system, in particular camera images and microphone recordings as well as temperature, pressure, radiation and humidity sensors, not only for adjusting and controlling the laser machining process, but also offers the ability to monitor the state of the laser machining head. This includes monitoring optical components, in particular protective glasses or lenses, as well as monitoring parts subject to mechanical wear, such as nozzles, insulation parts or seals. Furthermore, the add-on module may make suggestions to the user or the control device of the laser machining system regarding the replacement or maintenance of components of the laser machining head (so-called "predictive maintenance"). This results in a simplified maintenance option for the laser machining head. Furthermore, no longer a plurality of devices are required for the initial start-up, control or monitoring of the laser machining system, the laser machining head or the laser machining process. Rather, these functions may be bundled in a single add-on module. By means of the add-on module, a large number of devices and/or apparatus or their functionalities are combined into one add-on module. A single add-on module provides several benefits to a user: one-time start-up and integration into the laser machining system, cost reduction and more insight into the laser machining process, monitoring through the combination of different sensor and data sources and easy updates either through software or through replacement of the add-on module.

According to one aspect of the present disclosure, an add-on module for intercoupling or interposing between a control device and a laser machining head of a laser machining system, in particular a laser cutting system, is specified, wherein the add-on module comprises: a first interface, wherein the add-on module is configured to exchange data with the laser machining head and/or with at least one sensor device of the laser machining system via the first interface; a second interface, wherein the add-on module is configured to exchange data with the control device of the laser machining system via the second interface; and a processing unit configured to process data received from the laser machining head and/or from the control device and/or from the at least one sensor device and to transmit the processed data to the laser machining head and/or to the control device and/or to the at least one sensor device. A plurality of interfaces may be provided in each case. The laser machining system may include, in addition to the laser machining head and the control device (i.e., the system control), the at least one sensor device. The laser machining system may be a laser cutting system and the laser machining head may be a laser cutting head.

The add-on module preferably comprises a housing which defines an external appearance of the add-on module and which includes the interfaces of the add-on module. In other words, the interfaces may be formed on the housing. In the housing, the processing unit may be provided.

The add-on module may comprise a data storage or be connected to a data storage (e.g., via USB, via the communication interface, via a network or online). The data storage is configured to store received data and/or processed data. The data storage may, in particular, be configured to store individual steps of the laser machining process, for example piercing, cutting, evaporating, etc., predetermined machining parameter sets, sensor data and/or state values of the laser machining head.

The add-on module may further comprise a third interface, wherein the add-on module is configured to exchange data with at least one further sensor device of the laser machining system via the third interface, and/or a fourth interface, wherein the add-on module is configured to exchange data with a laser beam generating device of the laser machining system via the fourth interface. The further sensor device may be, for example, a distance sensor. The third interface may be configured as a BNC interface. The add-on module may further comprise a fifth interface, wherein the add-on module is configured to exchange data with at least one gas supply device of the laser machining system via the fifth interface in order to control a process gas supply into the machining head and/or onto a workpiece. The gas supply device may be or comprise a gas valve.

The add-on module thus comprises a multitude of interfaces to receive sensor values and/or measurement signals detected by the at least one sensor device or the at least one further sensor device. The at least one sensor device and/or the at least one further sensor device may be arranged on the laser machining head and/or on the workpiece. The sensor device may include at least one of a light sensor, photo sensor, temperature sensor, vibration sensor, OCT sensor, humidity sensor, pressure sensor, position sensor, distance sensor, acceleration sensor, laser power sensor, radiation sensor, plasma sensor, flow sensor, sound sensor, microphone unit or camera unit or combinations thereof. The at least one sensor device and/or the at least one further sensor device preferably serves to determine process and material properties, in particular a state of the laser machining head. In addition, data for determining the laser power and distances may be received via the interfaces and subsequently evaluated.

The processing unit may be configured to process data, in particular data from the data storage or from a database, with high-performance processors by means of various statistical techniques and machine learning methods, for example clustering methods, deep (convolutional) neural networks and support vector machines. The processing may be performed completely within the add-on module or by the add-on module.

The add-on module may further comprise a communication interface, wherein the add-on module is connectable to a communication network via the communication interface. The communication network may be the Internet or a local network. The add-on module may be configured to provide received data and/or processed data and/or data stored in the data storage via the communication network. In this case, the data processing by the processing unit of the add-on module may take place by interaction with an external processing unit or computing unit, for example a cloud server. The add-on module may be configured to transfer received data and/or processed data and/or data stored in the data storage via the communication network to an external storage. Thus, the communication interface allows to transfer data from the data storage of the add-on module, in particular a long-term storage of the add-on module, to an external storage via the communication network such that at least a portion of said data is stored on the external storage. Furthermore, providing a communication interface allows remote access to the laser machining system, in particular for remote maintenance.

The communication interface may also be referred to as a "communication device". The communication interface is configured to integrate the add-on module into a communication network, in particular a local network and/or the Internet. The add-on module may be accessed via the communication network. In particular, the data stored in the data storage, in particular processed data and/or received data, may be accessed via the communication network. The data may include machining parameters and/or machining parameter sets of the laser machining process, measurement and/or sensor values and state values of the laser machining head. Access via the communication network to the add-on module, also referred to as "remote connection", may occur via a secure connection, in particular a VPN connection or tunnel. The access via the communication network allows remote control, remote monitoring and/or remote maintenance of the laser machining head, for example by query, evaluation and/or monitoring of the state values of the laser machining head.

The add-on module may further comprise at least one user interface, in particular a graphical user interface (GUI). The user interface may be provided at the add-on module itself. For example, the add-on module may have a screen. Alternatively, the user interface may be provided at a separate device and connected to the add-on module via the communication network. The user interface of the add-on module is provided in addition to or separately from a user interface of the control device, i.e., the human machine interface of the CNC. The add-on module may be configured to output data, in particular data stored in the data storage and/or processed data, to a user of the add-on module and/or to receive data from a user of the add-on module via the user interface.

In particular, the add-on module may comprise a screen and/or a keyboard, computer mouse or the like or be connected thereto via an interface. The add-on module may be further configured to be programmable by the user via the user interface.

Overall, there are three ways to communicate with or to operate the add-on module: First, the add-on module may receive data from or send data to the control device via the second interface 402 of the control device. In other words, the add-on module may be operated via the control device or a human machine interface of the control device. Second, the add-on module may itself receive or output data via the user interface of the add-on module. Here, the graphical user interface of the user interface may be displayed on the add-on module itself, on a screen connected to the add-on module, or on a local PC connected via the communication interface of the add-on module. Third, a remote connection to a remote computer or tablet can be used to communicate with the add-on module by connecting the communication interface of the add-on module to the Internet.

The add-on module may be configured to receive sensor data from the at least one sensor device and/or from the laser machining head, and/or to receive machining parameters from the control device. The received sensor data may include at least one measured value, sensor value, measuring signal and/or sensor signal from at least one sensor of the laser machining head, also referred to as "head sensor system", and/or from at least one further sensor, in particular a sensor at another component of the laser machining system, also referred to as "process sensor system".

The add-on module may be configured to transmit machining parameters and/or control signals to the laser machining head and/or to the laser beam generation device and/or to the control device, and/or to transmit sensor data to the control device.

The machining parameters may include laser power, gas pressure, nozzle type, nozzle diameter, distance from the laser machining head to a workpiece, feed rate, focal position of a laser beam of the laser machining head, beam diameter of a laser beam of the laser machining head, machining direction and/or machining path.

The add-on module may be configured to forward the data received from the at least one sensor device directly to the control device and/or to forward the machining parameters received from the control device directly to the laser machining head and/or to the laser beam generation device.

The add-on module may be configured to receive sensor data from the at least one sensor device and/or the laser machining head in order to process the received sensor data, in particular by means of the processing unit, to adapt the machining parameters received from the control device based on the processed sensor data, and/or to transmit the adjusted machining parameters to at least one component including the laser machining head, the laser beam generating device, and the control device.

Thus, the add-on module makes it possible to provide the control device of the laser machining system with suggestions for optimal and/or optimized machining parameters of the laser machining process. Furthermore, the add-on module makes it possible to provide the laser machining head with adjusted, corrected optimal and/or optimized machining parameters, for example distance values of the laser machining head to a workpiece and/or positions of lenses of the laser machining head offline, in particular between two laser processing processes, or online, in particular in real time. In addition, machining parameters or control values for the z-axis, in particular for the distance of the laser machining head to a workpiece, may be provided to the control device in order to ensure a constant distance to the workpiece.

The processing unit may be configured to process the received data, in particular the received sensor data, in real time.

The processing unit may further be configured to determine, based on the received sensor data, a state of the laser machining head and/or a laser machining process and to forward it to the control device.

The add-on module may also be configured to detect an event and/or a machining result of a laser machining process based on the received sensor data.

In particular, the machining process event may include a puncture, a cut-through, and a cut-off or the occurrence of self-burning.

The add-on module may be connectable to the laser machining head and the control device via the first and second interfaces.

The add-on module may be exchangeably and/or removably integrated in a control cabinet of the laser machining system.

The add-on module may be arranged separate, in particular spatially separate, from the control device and the laser machining head, and/or arranged outside the control device and the laser machining head.

According to a further aspect of the present disclosure, a laser machining system is specified, wherein the laser machining system comprises a control device, at least one laser machining head, at least one sensor device associated with the at least one laser machining head and at least one add-on module described above. In addition, the laser machining system may include a laser beam generating device.

Thus, in accordance with the present disclosure, the add-on module functions as a mediator between laser machining head and control device of a laser machining system, for example, in order to bundle or process, in an interpretable manner, a flood of data of the laser machining head and/or sensor devices and/or a laser beam generating device and to receive, transmit, forward or save it to one of the components the laser machining system.

BRIEF DESCRIPTION OF THE DRAWINGS

Hereinafter, the invention will be described in detail with reference to figures. In the figures.

DETAILED DESCRIPTION OF THE DRAWINGS

Figure 1:
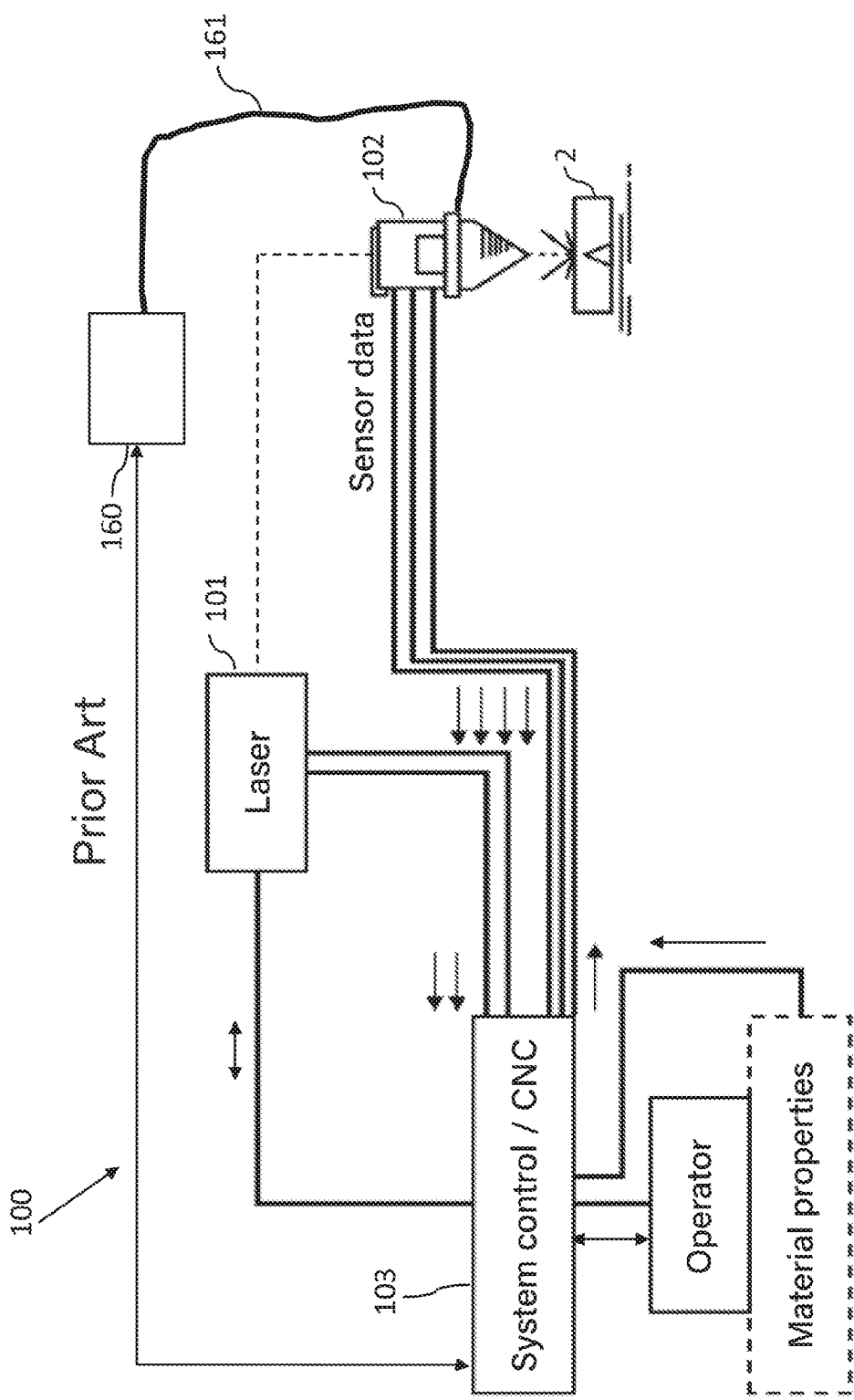
FIG. 1 shows a laser machining system of the prior art.
Figure 2:
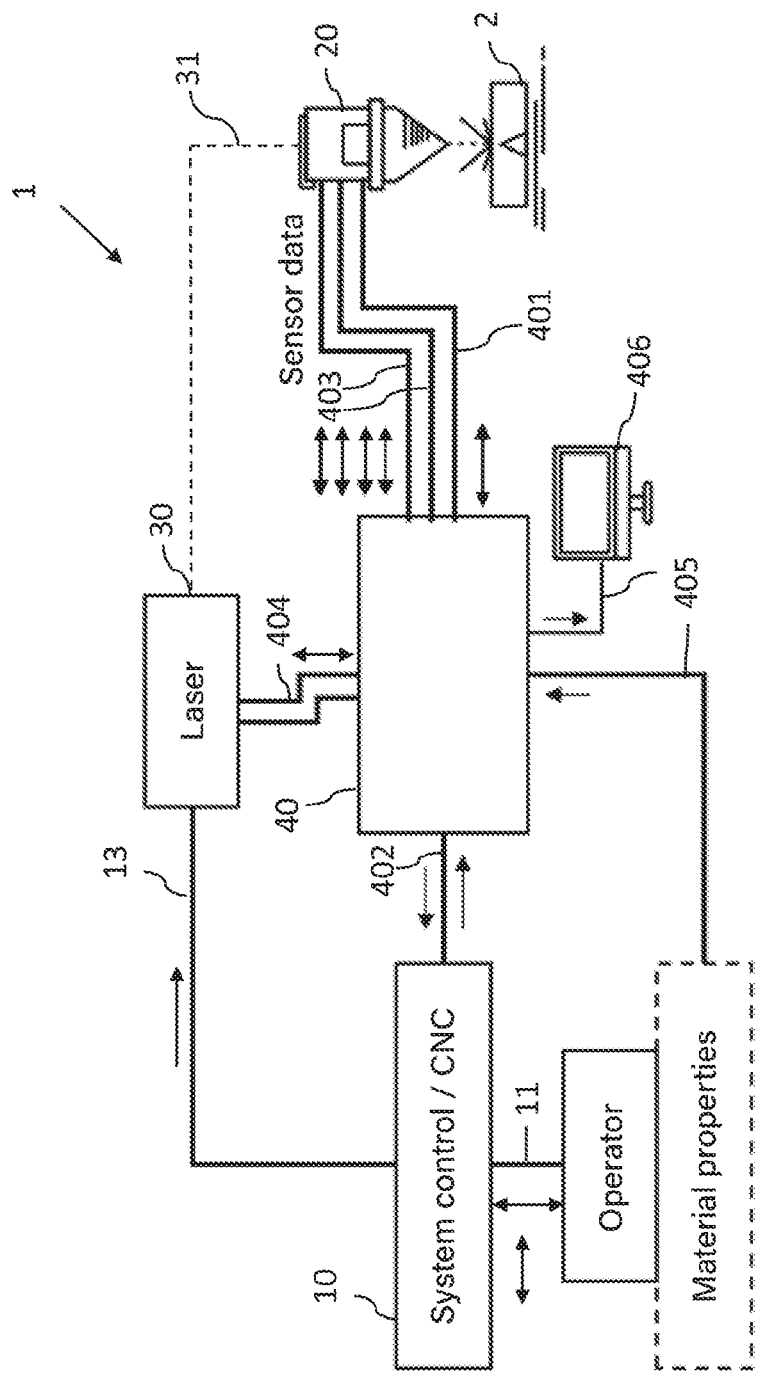
FIGS. 2-7 each show an add-on module and a laser machining system according to embodiments of the present disclosure.

In the following, unless otherwise stated, the same reference numerals are used for the same or equivalent elements.

FIGS. 2-7 each show an add-on module 40 and a laser machining system according to embodiments of the present disclosure. The laser machining system 1 comprises a control device 10, also referred to as a system control, at least one laser machining head 20, a laser beam generating device 30 associated with the laser machining head, at least one sensor device (not shown) and at least one add-on module 40 for monitoring and controlling the laser machining head 20. The laser beam generating device 30 is configured to generate a laser beam and, for example, to pass it to the laser machining head 20 via an optical fiber 31. The laser beam generating device 30 may receive data, in particular control data, from the control device 10 for this purpose.

The control device 10 comprises a user interface 11 for receiving data, in particular input data, from an operator and for outputting data, in particular output data, to the operator. The control device 10 further comprises an interface 13 to the laser beam generating device 30 for transmitting control data thereto. The control device 10 may, in particular, be configured to control the drive units for the axes of movement.

The add-on module 40 includes at least one first interface 401 to the laser machining head 20 and is configured to exchange data with the laser machining head 20 via the first interface 401. On the one hand, the add-on module 40 may, for example, transmit control signals to the laser machining head 20 via the first interface 401 in order to control the laser machining head 20 or components included therein, such as optical components. On the other hand, the add-on module 40 may receive, for example, data characterizing a state of the laser machining head 20 from the laser machining head 20 via the first interface 401. In particular, the add-on module 40 may communicate with a head drive and/or a sensor device 21 (see FIG. 8) of the laser machining system via the first interface 401. For example, the add-on module 40 may receive sensor data from the at least one sensor device via the first interface 401 to the laser machining head. Furthermore, the add-on module 40 may process said sensor data and transmit said data to the control device 10 or output said data as control signals to the laser machining head 20. In other words, the add-on module 40 may be configured to facilitate data processing in the control device 10 and/or to accelerate control of the laser machining head 20. The first interface 401 is preferably configured to receive data at a high sampling rate from the sensor device, in analog and/or digital form.

The add-on module 40 further comprises a second interface 402 to the control device 10. The add-on module 40 is configured to exchange data with the control device 10 via the second interface 402. For example, the add-on module 40 may receive machining parameters and/or control signals from the control device 10. These machining parameters and/or control signals may have been entered by an operator via the user interface 11 or generated by the control device 10. Furthermore, the add-on module 40 may transmit optimized, adjusted or corrected machining parameters and/or control signals and/or sensor data to the control device 10. In other words, the add-on module 40 may be configured to facilitate communication between the control device 10 and the laser machining head 20.

Figure 7:
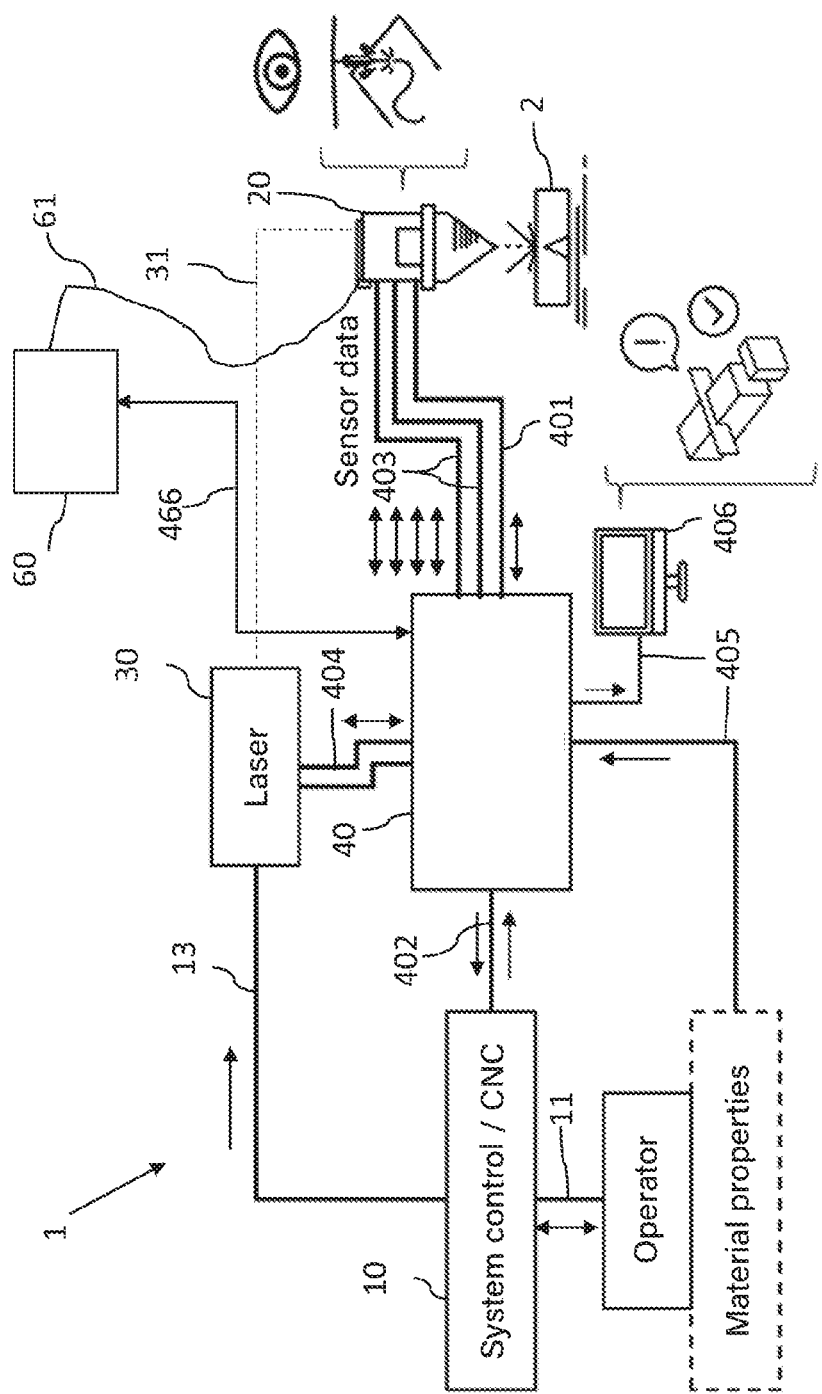
Figure 8:
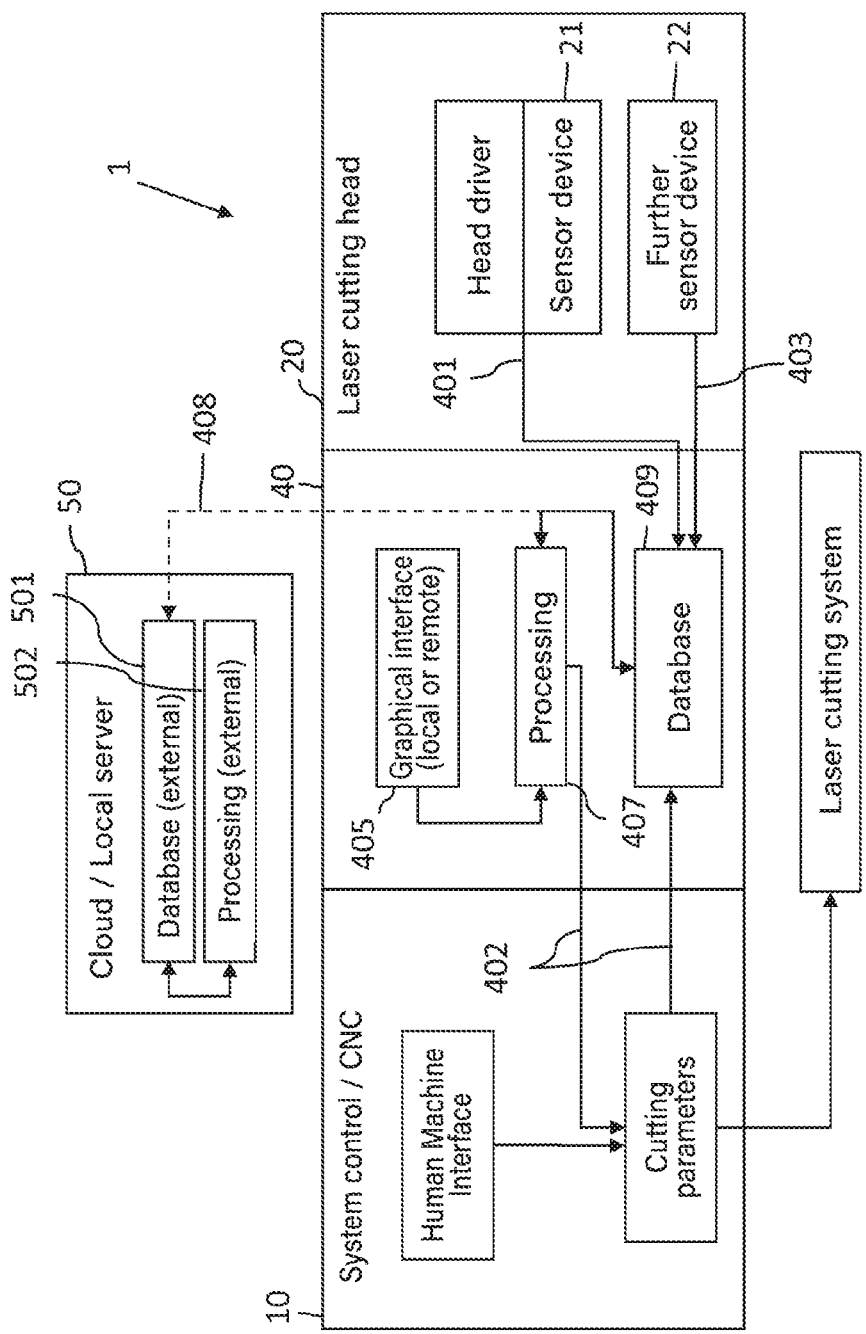
FIG. 8 shows an add-on module and a laser machining system according to further embodiments of the present disclosure.

Optionally, the add-on module 40 comprises at least one third interface 403 to at least one further sensor device 22 (see FIG. 8). In FIG. 2-7, two third interfaces 403 are shown. For example, a distance sensor may be connected to the add-on module 40 via a third interface 403 configured as a BNC interface. The add-on module 40 is then configured to exchange data with the at least one further sensor device of the laser machining system 1 via the at least one third interface 403. For example, the add-on module 40 may receive sensor data directly from the at least one further sensor device. Furthermore, the add-on module 40 may process said sensor data and transmit said data to the control device 10 or output said data as control signals to the laser machining head 20. In other words, the add-on module 40 may be configured to facilitate data processing in the control device 10 and/or to accelerate control of the laser machining head 20. The third interface 403 is preferably configured to receive data at a high sampling rate from the sensor device, in analog and/or digital form.

The sensor device 21 or the further sensor device 22 may be arranged on or in the laser machining head 20 or on the workpiece 2. The at least one sensor device may include at least one sensor selected from the group consisting of: light sensor, photo sensor, temperature sensor, sound sensor, vibration sensor, humidity sensor, pressure sensor, position sensor, acceleration sensor, radiation sensor, flow sensor, microphone, camera, distance sensor, plasma sensor, laser power sensor and OCT sensor. The sensor device may be configured to detect properties of the machining process and/or the workpiece and/or the laser machining head The machining parameters may include laser power, distance from the laser machining head to a workpiece, feed rate, position of an optics in the laser machining head, focal position of a laser beam of the laser machining system irradiated onto the workpiece, beam diameter of the laser beam of the laser machining system, a machining direction and/or machining path.

Optionally, the add-on module 40 comprises a fourth interface 404. The add-on module 40 is configured to exchange data with the laser beam generating device 30 via the fourth interface 404. For example, the add-on module 40 may receive data regarding the current laser power from the laser beam generating device 30 and/or transmit control data to the laser beam generating device 30.

The interfaces 401 to 404 may be combined into one physical interface.

The add-on module 40 further includes a processing unit (not shown) configured to process data. For example, the add-on module 40 may process data received from the laser machining head 20 and/or the control device 10 and/or the at least one sensor device and/or the laser beam generating device 30 and transmit the processed data to the same or to another of these units. The processing unit is preferably set up to process and/or forward data in real time. In one embodiment of the add-on module, the processing unit is configured to analyze data with high-performance processors using various statistical techniques and machine learning methods, e.g. clustering methods, deep neural networks and support vector machines. The processing unit is preferably further configured to transmit suggestions for machining parameters to the control device 10 or to provide optimized parameter values, for example a corrected lens position, to the laser machining head between individual process steps or in real time in the process. In addition, control values for the z-axis may be provided to the control device 10 in order to ensure a constant distance to the workpiece.

Furthermore, the add-on module 40 may include a data storage (not shown) configured to store received data and/or processed data. Alternatively, the add-on module 40 may be connected with such a data storage, e.g. via a communication interface (described below). The data stored in the data storage may include sensor data and/or data regarding the state of the laser machining head 20 and/or machining parameters set by an operator and/or by the control device 10. The data may be associated with individual laser machining steps, such as a piercing or cutting process.

The add-on module 40 may further comprise a user interface 405. The add-on module 40 may be configured to output data to a user and/or to receive data from a user via the user interface 405. The output may take place, for example, on a screen 406. The data entered may be, for example, machining parameters predetermined for a respective machining process, in particular cutting parameters, or specific workpiece and/or material properties.

The add-on module 40 shown in the embodiments according to FIGS. 2-7 is separate from the control device 10 and from the laser machining head 20, in particular spatially separate. In other words, the add-on module 40 is arranged outside the control device 10 and the laser machining head 20 and is connectable to both via at least one interface. The add-on module 40 may include a housing forming an outer appearance of the add-on module 40. At least the first interface 401 to the laser machining head 20, the second interface to the control device 10, and the third interface 403 to the sensor device are formed on the housing.

The add-on module 40 may be formed as an external add-on module or box. The add-on module 40 serves as a "mediator" between the laser machining head 20 and the control device 10 in order to bundle and process, in an interpretable manner, the flood of data from the laser machining head 20 and the laser beam generating device 30.

In addition, the add-on module 40 is used for processing and/or storage of sensor data or measured values and evaluation thereof.

Figure 3:
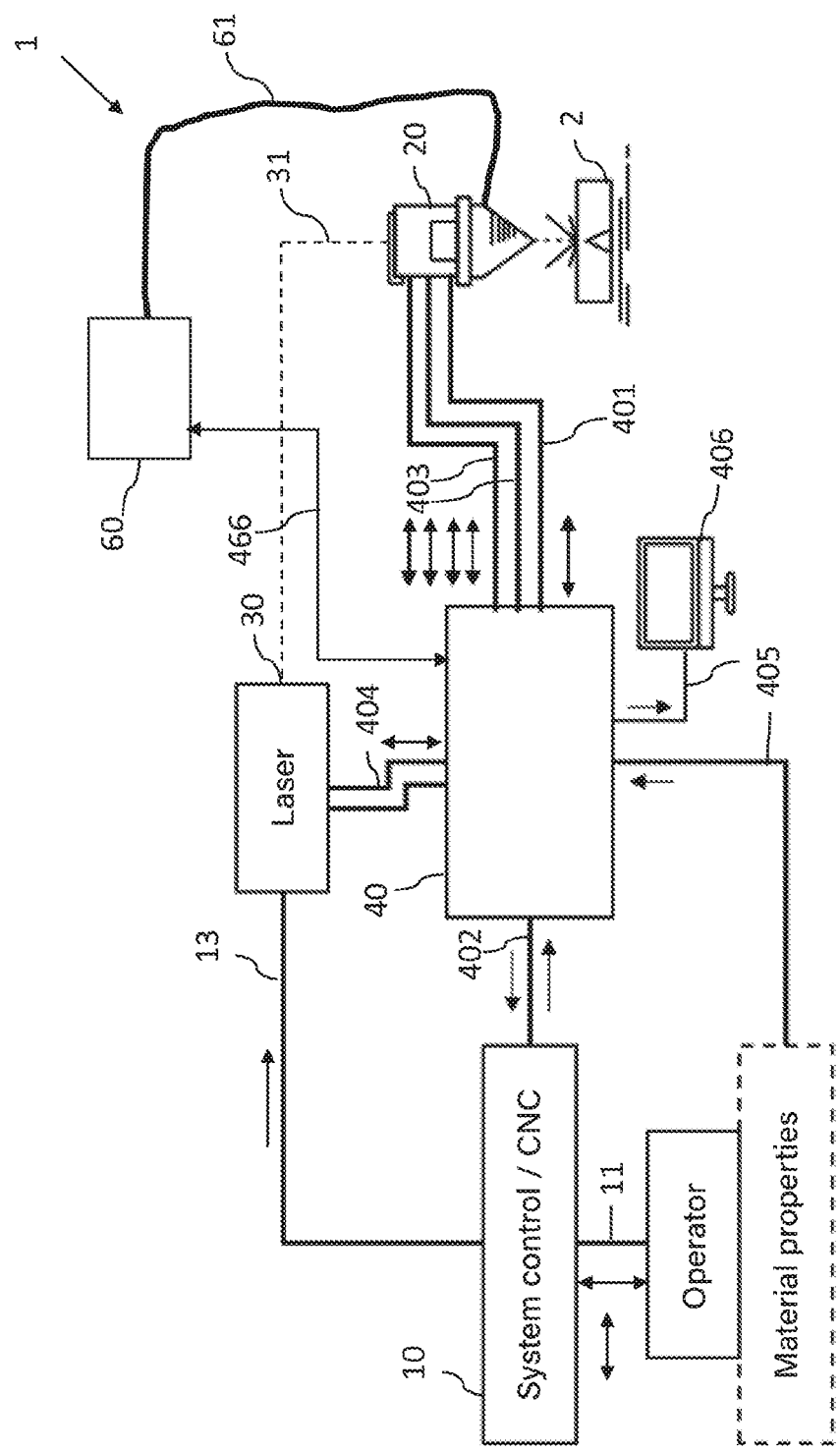

The laser machining system 1 in FIG. 3 comprises a gas supply device 60 connected to the add-on module 40 via a fifth interface 466 for control of the process gas supply, e.g. into the laser machining head 20 and/or onto the workpiece 2. The gas supply device 60 is connected to the laser machining head 20 by a gas line 61 in the example shown in FIG. 3. The gas supply device 60 may be or include a gas valve. In one embodiment, the gas supply device 60 may be controlled and/or read by both the add-on module 40 via the fifth interface 466 and the control device 10.

Figure 4:
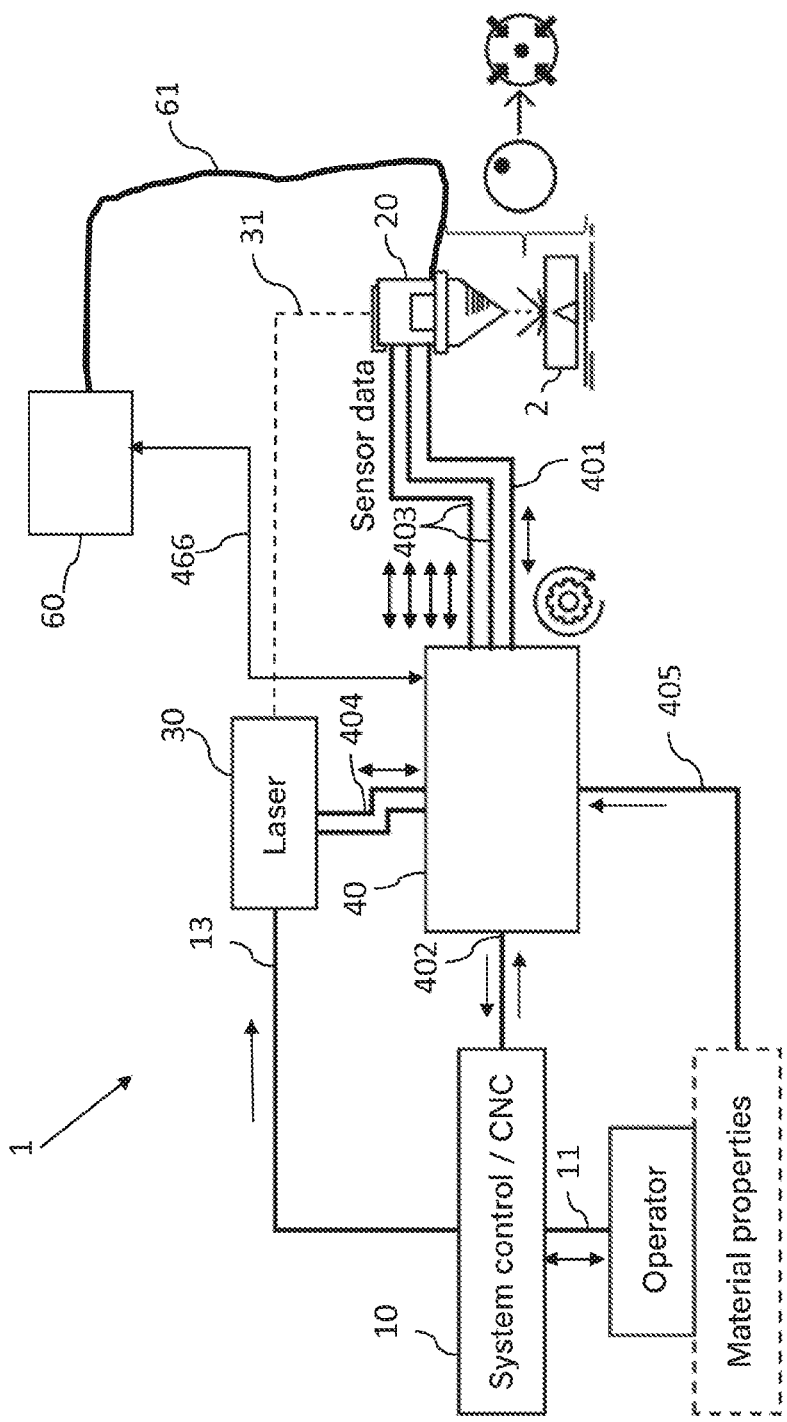

As shown in FIG. 4, the add-on module 40 simplifies the initial start-up of the laser machining system 1 or the laser machining process, and in particular allows automatic nozzle centering of a nozzle of the laser machining head 20. In particular, the add-on module 40 allows sensor and/or camera-based support of the initial start-up.

Figure 5:
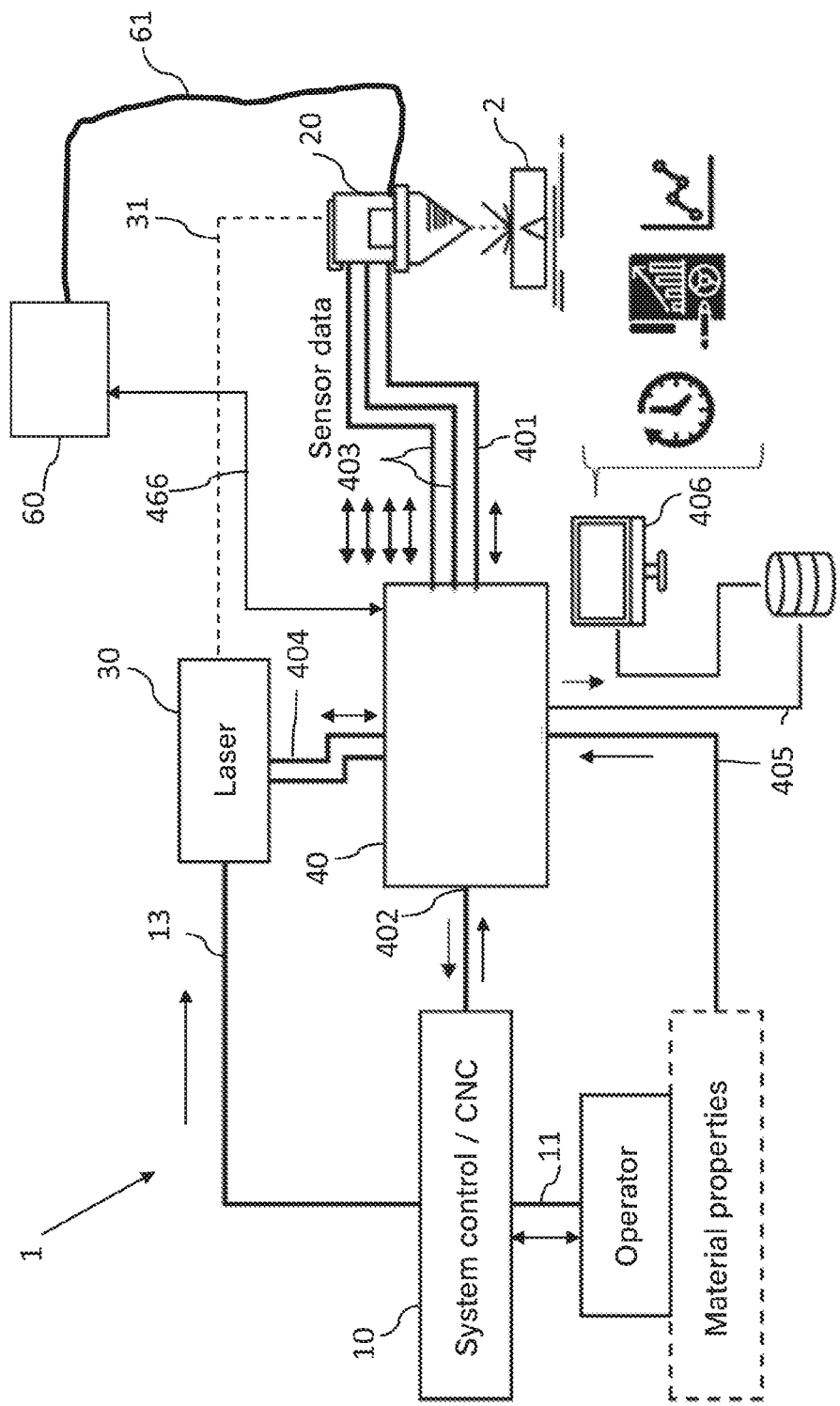

As shown in FIG. 5, the add-on module 40 further enables the long-term data storage of sensor data, machining parameters and/or state values of the laser machining head 20 and/or laser machining processes so as to enable manual evaluation of the data, for example by an expert.

As further shown in FIG. 5, the add-on module 40 makes it possible to perform a predefined measurement cycle for comparison with a reference measurement cycle so as to determine a state of the laser machining head 20 and/or to match the laser beam generating device 30 to the laser machining head 20. As a result, manufacturing variations of the laser machining head 20 and/or the laser beam generating device 30 may be compensated for and the initial start-up may be supported.

The add-on module 40 further allows so-called "live data processing" for adjusting machining parameters, monitoring and controlling the laser machining processes, in particular monitoring and controlling a piercing and cutting process, e.g. by means of artificial intelligence and machine learning.

The control of the laser machining process may include the control of one or more of the following elements: control of the laser machining head 20, in particular control of components included in the laser machining head 20, such as focusing optics, collimating optics, beam shaping optics, scanner mirrors, or the like, control of the laser beam generating device 30, in particular control of the laser power, duty cycle, beam shaping, back reflex sensor, etc., control of a cutting gas pressure, control of axes of the machining process, and control of the distance from the laser machining head 20 to the workpiece (i.e., the nozzle distance).

As a result, monitoring and control of a complete optical path of the laser beam from the laser beam generating device 30 to the exit from the laser machining head 20 are possible. For example, when errors or defects occur, it is easy to discriminate between defects of the laser machining head 20, the laser beam generating device 30, and an optical fiber between the laser beam generating device 30 and the laser machining head 20.

Figure 6:
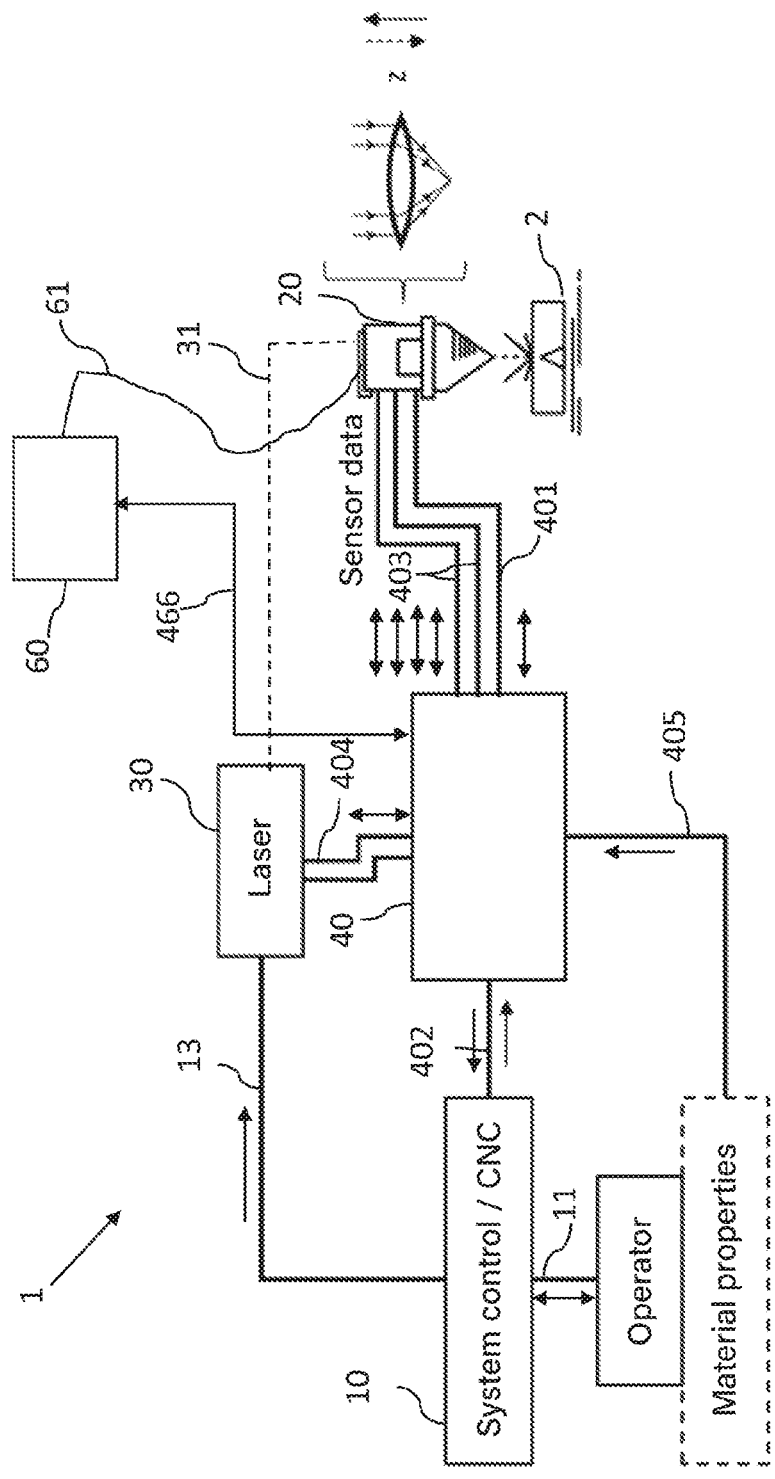

As shown in FIG. 6, it is further possible to monitor and/or control the laser machining process, in particular a laser cutting process, with automatic compensation of a so-called "focus shift" of optical components of the laser machining head 20.

As shown in FIG. 7, monitoring and/or control of the laser machining process with automatic puncture or cut-through detection are also possible by means of the add-on module 40. For example, the detection is carried out by means of an evaluation of sensor data, in particular camera images, by means of the add-on module 40. With the help of this functionality, a piercing process may be optimized. In particular, by means of the add-on module, the correct machining parameters, e.g. the correct piercing parameters and/or optimal parameters are selected for faster piercing, and cut-offs may be prevented.

FIG. 8 shows a laser machining system according to further embodiments of the present disclosure. The laser machining system shown in FIG. 8 corresponds to the laser machining system shown in FIGS. 2-7 except for the differences described below.

According to embodiments, the add-on module 40 further comprises a communication interface 408 (see FIG. 8), wherein the add-on module 40 is connectable to a communication network, such as a local area network or the Internet, via the communication interface. The add-on module 40 may be configured to provide received data and/or processed data and/or data stored on the data storage via the communication network. This enables so-called "remote monitoring" and access to the laser machining head for remote maintenance. The communication interface may provide access from the communication network via a secure connection, e.g. via a VPN tunnel, to the user interface of the add-on module 40 and to data stored in the add-on module, e.g. parameter sets, process properties, sensor values, state values of the laser machining or cutting head. Access via a secure network connection allows for remote maintenance of the laser machining system or head by accessing the data as well as remote control of the range of functions of the add-on module.

The add-on module 40 of the laser machining system 1 shown in FIG. 8 comprises a further interface 408 for communication with a server 50, in particular a cloud, or a network, in particular the Internet or a local network. The communication via the communication interface 408 may be wireless or wired. The add-on module 40 shown in FIG. 8 may be one of the add-on modules 40 shown above in FIGS. 2 to 7, additionally having said communication interface 408. As mentioned above, the data storage 409 is optional. Additionally or alternatively, an external database 501 may be provided, e.g. by the server 50, and connected to the add-on module 40 via the communication interface 408. The server 50 may be configured as a local server. The processing unit 407 of the add-on module 40 is connected to the database 501 and/or a processing unit 502 of the server 50 via the communication interface 408 and is configured to communicate with the database 501 or the processing unit 502. As a result, tasks and/or steps regarding data processing may be outsourced to the processing unit 502 by the processing unit 407 of the add-on module 40. Furthermore, data may be stored externally in the database 501 and data stored externally in the database 501 may be accessed by the add-on module. In addition, the database 501 allows data to be stored for a plurality of add-on modules 40. Like the communication interface, the user interface 405 may be configured for wireless communication. It is also possible to use the communication interface 408 as the user interface 405 and to transmit user input data from a PC or tablet via the communication interface 408 and a network to the add-on module 40.

By providing an add-on module according to embodiments of the present disclosure in a laser machining system, wherein said add-on module is formed separately from the control device and the laser machining head and connectable to these elements and to sensor devices via respective interfaces for exchanging data, the following advantages may be achieved:

By not implementing the described functions of the add-on module within the control device or the system control, usually a CNC, an over-demand on the control device can be prevented. Furthermore, the add-on module may provide computational and/or storage capacity beyond that of a typical system control. The add-on module may further provide special or specialized computational architectures, such as AI processors, which are not included in a typical system control. Furthermore, the add-on module may take over the pre-processing of the data of the sensor devices and of the laser machining head in order to reduce the amount of data to be stored. These functions require expert knowledge, a development environment, and computing power that a typical system control cannot provide. The system control typically only has standard interfaces, in particular I/O, buses, but in general no frame grabbers etc. In addition, a system control is not configured for particularly fast communication at high data rates with many components. In addition, the security of the laser machining system is increased since the possibility of remote connection or remote maintenance would be more detrimental to security in the system control than in a separate component. This results in a lower sabotage risk. Finally, existing laser machining systems may be easily and inexpensively retrofitted with modern functions by replacing or retrofitting the add-on module without having to replace the system control itself.

By not implementing the described functions of the add-on module within the laser machining head, but in a separate module, the laser machining head remains compact and lightweight. Furthermore, the laser machining head can be protected more easily from process influences, for example dust, splashing, high temperatures and high temperature fluctuations, high accelerations, crashes, etc. In case of maintenance, only the laser machining head has to be replaced. The add-on module does not need to be replaced.

By not implementing the described functions of the add-on module within the laser beam generating device, but in a separate module, a quick and easy exchangeability of the laser beam generating device can also be ensured. The computing power of the laser beam generating device can be limited to the essential functions. Thereby, the laser beam generating device may be made inexpensively.

By means of the add-on module according to the invention, many individual units and devices for functionalities optimizing a laser machining process are combined and fused into one unit. A single separate module provides several benefits to a user: one-time setup and integration into the laser machining system, cost reduction and more insight into the laser machining process, as well as monitoring via the combination of different sensor and data sources.

The invention claimed is:

1. A laser machining system for machining a workpiece by means of a laser beam, comprising:
   a computing numerical control (CNC) type system control device;
   at least one laser machining head;
   at least one sensor device associated with the at least one laser machining head; and
   an add-on module intercoupled or interposed between said system control device and the at least one laser machining head of the laser machining system, the add-on module comprising:
      a first interface, wherein said add-on module is connectable to said laser machining head and/or at least one sensor device of said laser machining system via said first interface so as to exchange data;
      a second interface, wherein said add-on module is connectable to said control device via said second interface so as to exchange data;
      a user interface, wherein said add-on module is configured to output data to a user of said add-on module and/or receive data from a user of said add-on module via said user interface; and
      a processing unit configured to process data and to output the processed data via said first and second interfaces,
   wherein said add-on module is configured to:
      receive data from the at least one sensor device and/or the laser machining head;
      process the received data in order to adjust machining parameters received from said system control device based on the processed data; and
      transmit the adjusted machining parameters to said laser machining head.

2. The laser machining system for machining a workpiece by means of a laser beam according to claim 1, further comprising:
   a housing defining an external appearance of said add-on module; wherein said housing includes the interfaces of said add-on module and said processing unit is arranged within said housing.

3. The laser machining system for machining a workpiece by means of a laser beam according to claim 1, wherein said add-on module is formed separately from said system control device and from said laser machining head, and/or wherein said add-on module is arranged outside said system control device and said laser machining head.

4. The laser machining system for machining a workpiece by means of a laser beam according to claim 1, further comprising:
   a data storage configured to store received data and/or processed data.

5. The laser machining system for machining a workpiece by means of a laser beam according to claim 1, further comprising:
   a communication interface, wherein said add-on module is connectable to a network via said communication interface so as to provide received data and/or processed data and/or data stored on the data storage via the communication network; and/or
   a third interface to at least one further sensor device of said laser machining system, wherein said add-on module is connectable to said further sensor device via said third interface so as to exchange data; and/or
   a fourth interface, wherein said add-on module is connectable with a laser beam generating device of said laser machining system associated with said laser machining head via said fourth interface so as to exchange data; and/or
   a user interface, wherein said add-on module is configured to output data to a user of said add-on module and/or receive data from a user of said add-on module via said user interface.

6. The laser machining system for machining a workpiece by means of a laser beam according to claim 1, wherein said add-on module is configured to receive data from said at least one sensor device and/or said laser machining head and/or a laser beam generating device of said laser machining system and/or a gas supply device of said laser machining system for controlling a process gas supply, and/or to receive machining parameters from said system control device.

7. The laser machining system for machining a workpiece by means of a laser beam according to claim 1, wherein said add-on module is configured to transmit machining parameters and/or control signals to said laser machining head and/or said control device and/or to a laser beam generating device of said laser machining system and/or to a gas supply device of said laser machining system for controlling a process gas supply, and/or to transmit data to said system control device.

8. The laser machining system for machining a workpiece by means of a laser beam according to claim 1, wherein said add-on module is configured to receive data from a laser beam generating device of the laser machining system and/or a gas supply device of the laser machining system for controlling a process gas supply so as to process the received data in order to adjust the machining parameters received from said system control device based on the processed data and to transmit the adjusted machining parameters to said laser machining head and/or said system control device and/or a laser beam generating device of said laser machining system and/or a gas supply device of said laser machining system for controlling a process gas supply.

9. The laser machining system for machining a workpiece by means of a laser beam according to claim 1, wherein said processing unit is configured to process the received data in real time.

10. The laser machining system for machining a workpiece by means of a laser beam according to claim 1, wherein said processing unit is further configured to determine information on a state of said laser machining head and/or a state of a laser machining process based on data received from said sensor device and/or said laser machining head and forward said information to said system control device.

11. The laser machining system for machining a workpiece by means of a laser beam according to claim 1, wherein said add-on module is further configured to detect an event and/or a machining result of a laser machining process based on data received from said sensor device and/or said laser machining head.

12. The laser machining system for machining a workpiece by means of a laser beam according to claim 1, wherein said sensor device comprises at least one sensor selected from the group consisting of the following sensors: light sensor, photo sensor, temperature sensor, sound sensor, camera, distance sensor, plasma sensor, laser power sensor, acceleration sensor, position sensor, pressure sensor, humidity sensor, vibration sensor, radiation sensor, flow sensor, and OCT-based sensor.

13. The laser machining system for machining a workpiece by means of a laser beam according to claim 1, wherein said machining parameters include laser power, distance from said laser machining head to a workpiece, feed rate, gas pressure, nozzle diameter, nozzle type, focal position of a laser beam of said laser machining head, beam diameter of a laser beam of said laser machining head, machining direction and/or machining path.

14. The laser machining system for machining a workpiece by means of a laser beam according to claim 4, wherein the add-on module is configured:
   to provide received data and/or processed data and/or data stored in the data storage via the communication network to an external processing unit such that the data processing by the processing unit of the add-on module takes take place by interaction with the external processing unit, and/or
   to transfer received data and/or processed data and/or data stored in the data storage via the communication network to an external storage.

15. The laser machining system for machining a workpiece by means of a laser beam according to claim 1, further comprising:
   a gas supply device for supplying a process gas; and/or
   a laser beam generating device associated with said at least one laser machining head.

16. A laser machining system for machining a workpiece by means of a laser beam, comprising:
   a computing numerical control (CNC) type system control device,
   at least one laser machining head,
   at least one sensor device associated with the at least one laser machining head, and
   an add-on module intercoupled or interposed between said system control device and the laser machining head of the laser machining system, the add-on module comprising:
      a first interface, wherein said add-on module is connected to said laser machining head and/or said at least one sensor device via said first interface so as to exchange data;
      a second interface, wherein said add-on module is connected to said system control device via said second interface so as to exchange data;
      a user interface, wherein said add-on module is configured to output data to a user of said add-on module and/or receive data from a user of said add-on module via said user interface; and a processing unit configured to process data and to output the processed data via said first and second interfaces, wherein said add-on module is configured to:
receive data from the at least one sensor device and/or the laser machining head;
process the received data in order to adjust machining parameters received from said system control device based on the processed data; and
transmit the adjusted machining parameters to said laser machining head;
wherein the machining parameters include at least one of laser power, gas pressure, nozzle type, nozzle diameter, distance from the laser machining head to a workpiece, feed rate, focal position of a laser beam of the laser machining head, beam diameter of a laser beam of the laser machining head, machining direction and machining path.

17. A laser machining system for machining a workpiece by means of a laser beam, comprising:
a computing numerical control (CNC) type system control device,
at least one laser machining head,
at least one sensor device associated with the at least one laser machining head, and
an add-on module intercoupled or interposed between said system control device and the laser machining head of the laser machining system, the add-on module comprising:

a first interface, wherein said add-on module is connected to said laser machining head and/or said at least one sensor device via said first interface so as to exchange data;
a second interface, wherein said add-on module is connected to said system control device via said second interface so as to exchange data;
a user interface, wherein said add-on module is configured to output data to a user of said add-on module and/or receive data from a user of said add-on module via said user interface; and
a processing unit configured to process data and to output the processed data via said first and second interfaces,
wherein said add-on module is configured to:
receive sensor data from the at least one sensor device;
process the received sensor data in order to adjust machining parameters received from said system control device based on the processed data; and
transmit the adjusted machining parameters to said laser machining head;
wherein the machining parameters include at least one of laser power, gas pressure, nozzle type, nozzle diameter, distance from the laser machining head to a workpiece, feed rate, focal position of a laser beam of the laser machining head, beam diameter of a laser beam of the laser machining head, machining direction and machining path.

\* \* \* \* \*